UNITED STATES PATENT OFFICE.

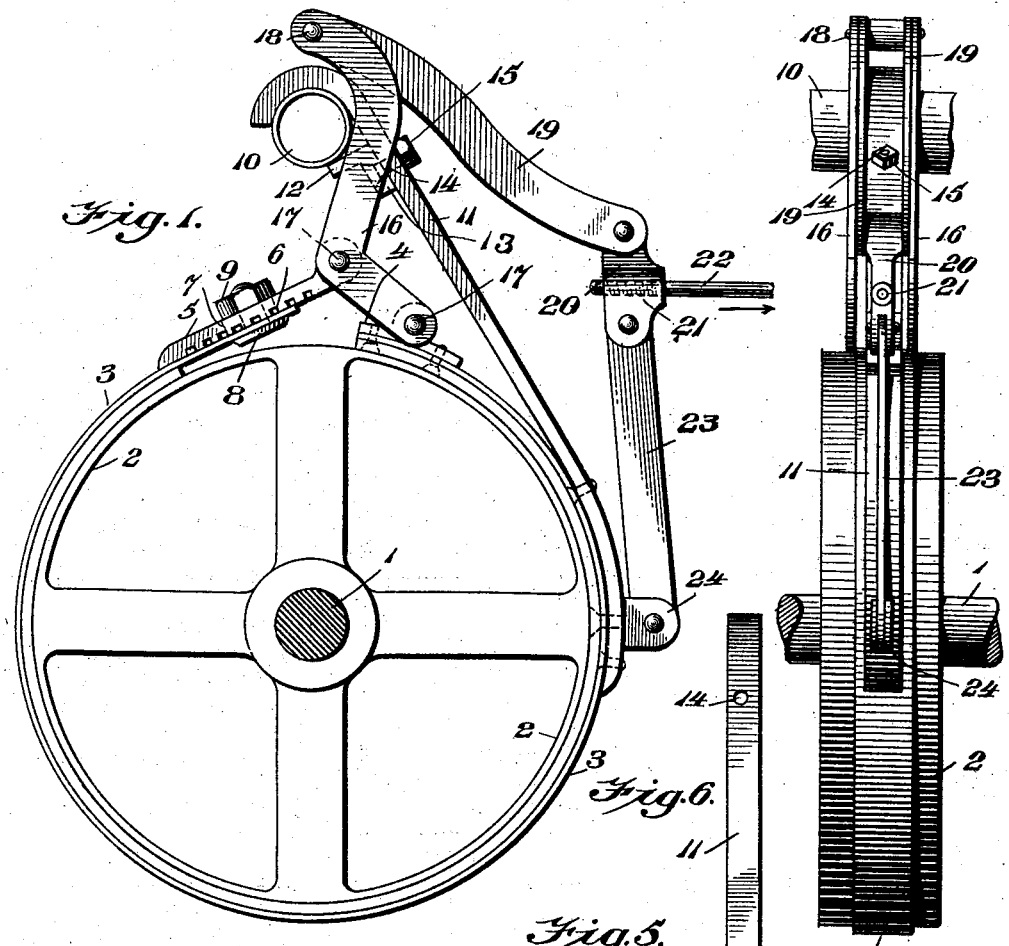

ELLSWORTH M. LETTS, OF WAVERLY, NEW YORK, ASSIGNOR OF ONE-HALF TO ELLSWORTH GAMBLE, OF WAVERLY, NEW YORK.

VEHICLE-BRAKE.

SPECIFICATION forming part of Letters Patent No. 699,962, dated May 13, 1902.

Application filed September 16, 1901. Serial No. 75,542. (No model.)

*To all whom it may concern:*

Be it known that I, ELLSWORTH M. LETTS, a citizen of the United States, residing at Waverly, in the county of Tioga and State of New York, have invented new and useful Improvements in Vehicle-Brakes, of which the following is a specification.

My invention relates to improvements in brakes for vehicles, and is designed more particularly for use in connection with that class of road-vehicles commonly designated as "automobiles;" but the brake may be used in other relations, if desired.

The invention consists in the construction and arrangement of parts hereinafter described, and pointed out in the appended claims.

The object of the invention is the provision of an improved band-brake which will be simple in construction and effective in operation.

A further object is to provide an improved brake which will avoid the necessity of peripheral or tire contact with the wheel and which will exert its power upon one of the axles of the vehicle.

These objects are obtained by the construction illustrated in the accompanying drawings, in which—

Figure 1 is a side elevation of a vehicle-brake constructed in accordance with my invention. Fig. 2 is a face view of the same. Figs. 3 and 4 are detail views of the eye and eye-plate, respectively. Fig. 5 is an elevation of one of the links employed in the invention, and Fig. 6 is a similar view of the hook.

To the rear axle 1 of the vehicle, adjacent the wheel-hubs, I mount a friction disk or drum 2, around which is placed a friction-band 3, having riveted to one end thereof an eye 4 and at its other end a detachable eye-plate 5. The detachable plate 5 has the lower side of its body portion provided with serrations 6. The end of the friction-band which is engaged by the plate 5 is bent at right angles with itself for a short distance and engages in the serrations 6 in the plate 5 and is provided with an elongated slot 7, through which passes a securing-bolt 8, which also passes through the said plate and is secured by a nut 9. It will be obvious that by this construction of brake-band the same can be adjusted to fit different sizes of brake-drums.

To the inner side of the brake-band 3 I secure a leather or other suitable lining, so as to preserve the band.

The band 3 is suspended from a bar or bracket 10, integral with or attached to the running-gear of the vehicle, by a hook 11, riveted or otherwise made fast to the outer side of the brake-band.

The hooked end of the rod 11 engages the projected rod or bracket 10 and is prevented from displacement by a block 12, slidably mounted in a supporting-rod adjacent its hooked end.

The block 12 has a threaded tongue 13, which extends through an opening 14 in the said rod and is provided on its outer end with a nut 15, by which means it is secured in its adjusted position.

16 designates a pair of bell-crank levers, between the lower ends of which are secured by means of pivot-pins 17 the eyes of the plates 4 and 5 of the brake-band. Secured by a pivot-pin 18, between the levers 16, is a downwardly-curved link 19. The outer end of this link 19 is pivoted to the upper end of a vertically-arranged short link 20, which is formed with a centrally-arranged screw-thread opening 21, adapted to receive the rear end of a brake-rod 22, provided with screw-threads.

In order to provide a suitable support for the rear end of the brake-rod, I have the lower end of the link 20 supported by a vertically-arranged rod 23, having its upper end pivoted to said short link and its lower end pivotally mounted on ears 24, which are fixed to the lower end of the brake-band-supporting rod 11.

The forward end of the brake-rod 22 is pivotally attached to an operating-lever pivotally mounted on the body of the vehicle in convenient reach of the operator.

From the foregoing description the operation will be readily understood. The brake-rod 22 is drawn forward in the direction indicated by the arrow, and through the medium of the link 19 the bell-crank levers 16 are drawn forward and by their peculiar construction and arrangement will tighten the friction-band 3 upon the drum 2.

It is obvious that a foot-lever can be used in lieu of a hand-lever to effect the braking operation.

I am aware that many minor changes in the constructions and arrangement and combination of the several parts of my device can be made and substituted for those herein shown and described without departing from the spirit and nature of my invention.

Having thus fully described my invention, what I claim as new, and desire to secure by Letters Patent, is—

1. A vehicle-brake comprising a friction-drum fixed to one of the vehicle-axles, a friction-band encircling the drum, a pair of bell-crank levers, the ends of the band being connected to the lower ends of the said levers, a rod secured to the outer face of the brake-band and having its upper end hooked to engage a bracket on the running-gear for supporting the said brake-band, a link pivotally secured between the upper ends of the said levers, a vertically-arranged rod pivotally secured at its lower end to the brake-band, a short link connecting the free ends of the said link and rod, and a brake-rod secured to said short link.

2. A vehicle-brake comprising a friction-drum fixed to one of the vehicle-axles, a friction-band encircling the drum, a pair of bell-crank levers, the ends of the band being connected to the lower ends of the bell-crank levers and the upper ends of said bell-crank levers being secured to a brake-rod, a rod secured to the outer side of the brake-band and having its upper end hooked to engage a bracket on the running-gear for supporting the said brake-band, a link provided with a central screw-threaded opening for the reception of the brake-operating rod, and a pair of rods pivoted to the upper and lower sides of the said link for supporting the same, the upper rod being secured to the said bell-crank levers and the lower rod secured to the said brake-band-supporting rod.

3. A vehicle-brake, comprising a friction-drum fixed to one of the vehicle-axles, a friction-band encircling the drum, eye-plates secured to the ends of said friction-band through the medium of which the band may be adjusted, a rod provided with a hooked end secured to the said friction-band for supporting the same, a sliding block arranged upon said bar, adjacent its hooked end for preventing displacement of the same, a pair of bell-crank levers pivoted to the eyes of the said friction-band, and extending on either side of the said supporting-rod, a brake-rod attached to said bell-crank levers and means for operating said brake-rod.

In testimony whereof I affix my signature in presence of two witnesses.

ELLSWORTH M. LETTS.

Witnesses:
WATSON E. ROBINSON,
ROBERT SCOTT WHITMAN.